United States Patent
Sasaki

[11] Patent Number: 5,877,823
[45] Date of Patent: Mar. 2, 1999

[54] PROJECTION TELEVISION DEVICE

[75] Inventor: Hiroshi Sasaki, Tokyo, Japan

[73] Assignee: Mitsubishi Denki Kabushiki Kaisha, Tokyo, Japan

[21] Appl. No.: 598,534

[22] Filed: Feb. 8, 1996

[30] Foreign Application Priority Data

May 24, 1995 [JP] Japan ................................. 7-125111

[51] Int. Cl.$^6$ ........................ H04N 3/23; H04N 9/31
[52] U.S. Cl. .................. 348/746; 348/806; 348/778; 313/463; 313/467; 313/2.1
[58] Field of Search ............................... 348/778, 779, 348/780, 745–747; 313/474, 473, 461–468, 1, 2.1; H04N 5/74, 9/31, 3/23

[56] References Cited

U.S. PATENT DOCUMENTS

| 3,507,551 | 4/1970 | Stetten ................................. | 313/468 |
| 4,142,126 | 2/1979 | DuBois ................................. | 313/497 |
| 4,274,110 | 6/1981 | Lehnert ................................ | 348/779 |
| 4,634,926 | 1/1987 | Vriens et al. ......................... | 313/474 |
| 4,914,510 | 4/1990 | Brennesholtz et al. ............... | 313/478 |
| 5,065,071 | 11/1991 | Donofrio et al. ..................... | 313/474 |
| 5,337,093 | 8/1994 | Kaneko et al. ....................... | 348/778 |
| 5,559,564 | 9/1996 | Nomura ................................ | 348/779 |

FOREIGN PATENT DOCUMENTS

| 53-50616 | 10/1976 | Japan . |
| 59-8936 | 10/1976 | Japan . |
| 55-64348 | 11/1978 | Japan . |
| 57-176651 | 4/1981 | Japan . |
| 63-160139 | 7/1988 | Japan . |
| 3-30245 | 6/1989 | Japan . |
| 3-77248 | 8/1989 | Japan . |
| 4-137329 | 2/1992 | Japan . |

Primary Examiner—Michael Lee

[57] ABSTRACT

A projection television device includes a projection cathode-ray tube for red ($1a$), a projection cathode-ray tube for green ($1b$) and a projection cathode-ray tube for blue ($1c$) which are provided with phosphor layers ($5a$, $5b$ and $5c$), respectively, each having a thickness which varies continuously so that it may be thick at the center portion and may be thinner at the peripheral portion. Having the above configuration, the projection television device makes it possible to suppress the loss in resolution and luminance at the peripheral portion of the image projected on the screen, thereby ensuring uniform resolution and luminance of the image. Thus, it becomes possible to enhance the quality of the image produced on the screen.

17 Claims, 6 Drawing Sheets

AREA − LUMINANCE CHARACTERISTICS OF IMAGE

IMAGE ON SCREEN

PROJECTION TELEVISION DEVICE

BACKGROUND OF THE INVENTION

1. Field of the Invention

The present invention relates to a projection television device to obtain a wide screen image without difficulty, and more particularly to a projection television device to achieve an image with excellent quality.

2. Description of the Background Art

FIG. 6 schematically illustrates a general construction of a projection television device including three projection cathode-ray tubes for red image, green image and blue image. The projection television device of FIG. 6 includes a projection cathode-ray tube for red 1a, a projection cathode-ray tube for green 1b, a projection cathode-ray tube for blue 1c, projection lenses 2a, 2b and 2c and a screen 3. FIG. 7 is a cross-sectional representation of structures of phosphor layers used for a projection television device in a background art. Phosphor layers 4a, 4b and 4c shown in FIG. 7 each have an almost uniform thickness. Other reference characters of FIG. 7 correspond to those of FIG. 6.

The background-art projection television device has an arrangement, as shown in FIG. 6, where the projection lens 2b is positioned at center in front of the screen 3, the projection lens 2a is positioned at one side of the projection lens 2b and the projection lens 2c is positioned at the other side of the projection lens 2b, both being tilted to the screen 3, and the projection cathode-ray tube for green 1b, the projection cathode-ray tube for red 1a and the projection cathode-ray tube for blue 1c are positioned behind the projection lenses 2b, 2a and 2c, respectively. In practice, the phosphor layers 4a, 4b and 4c are considerably thin and almost uniformly coat the inner faces of display window glasses (not shown) provided on respective surfaces of the projection cathode-ray tube for red 1a, projection cathode-ray tube for green 1b and the projection cathode-ray tube for blue 1c.

Now, an operation of the background-art projection television device will be discussed. Referring to FIG. 7, the phosphor layer 4a is irradiated by an electron beam within the projection cathode-ray tube for red 1a to draw a red image on the phosphor layer 4a. Similarly, the phosphor layer 4b is irradiated by an electron beam within the projection cathode-ray tube for green 1b to draw a green image on the phosphor layer 4b, and the phosphor layer 4c is irradiated by an electron beam within the projection cathode-ray tube for blue 1c to draw a blue image on the phosphor layer 4c. Referring next to FIG. 6, the red image on the projection cathode-ray tube for red 1a is projected on the screen 3, being magnified through the projection lens 2a. The green image on the projection cathode-ray tube for green 1b is projected on the screen 3, being magnified through the projection lens 2b. The blue image on the projection cathode-ray tube for blue 1c is also projected on the screen 3, being magnified through the projection lens 2c.

In the background art, however, this projection television device causes such phenomena as follows:

(1) FIG. 8 is a graphical representation showing a relation between an area and a spot diameter of a phosphor layer. This graph shows a relative spot diameter, where the indication of 100% represents the spot diameter at the center portion of the phosphor layer receiving a perpendicular entry of an electron beam. As can be seen from FIG. 8, the spot diameter is larger at an area closer to the periphery of the phosphor layer. Taking the red image as an example for discussion, the electron beam enters the center portion of the phosphor layer 4a almost perpendicularly, but it enters the peripheral portion of the phosphor layer 4a with large angle of incident to make the spot diameter larger. Accordingly, the resolution at the peripheral portion of an image on the screen 3, which is obtained by projecting the image of the phosphor layer 4a, is worse than the resolution at the center portion of the image on the screen 3.

(2) FIG. 9 is a graphical representation of MTF characteristics, showing a relation between an area and a resolution (MTF) of the image on the screen 3. As can be seen from FIG. 9, the MTF at the peripheral portion of the image projected on the screen 3 is worse than the MTF at the center portion of the image projected on the screen 3. Taking the red image as an example for discussion, the projection lens 2a generally has a spherical aberration and fabrication variation. When the image of the phosphor layer 4a is projected on the screen 3 through the projection lens 2a, the loss in MTF is produced more at the peripheral portion of the projected image than at the center portion of the projected image due to the spherical aberration and fabrication variation.

(3) FIG. 10 is a graphical representation showing a relation between an area and a luminance (brightness) of the image projected on the screen 3. This graph shows relative luminance, where the indication of 100% represents the luminance of the image projected on the center portion of the screen 3. As can be seen from FIG. 10, the luminance at the peripheral portion of the image projected on the screen 3 is worse than the luminance at the center portion of the image projected on the screen 3. Taking the red image as an example for discussion, a capture range of projected light in an entrance pupil of the projection lens 2a is wide at its center portion and narrow at its peripheral portion. Accordingly, when the image of the phosphor layer 4a is projected on the screen 3 through the projection lens 2a, the loss in luminance is produced more at the peripheral portion of the image projected on the screen 3 than at the center portion of the image projected on the screen 3 due to the difference in capture range of the projection light from the phosphor layer 4a (the light of image emitted from the phosphor layer 4a)

These phenomena (1), (2) and (3) as discussed above similarly occur in cases of the green image and blue image.

(4) FIG. 11 illustrates images which are drawn on the phosphor layers 4a, 4b and 4c when an image having a pattern 7 shown in FIG. 12, as an example of image, is formed on the screen 3. As can be seen from FIG. 11, the images of the phosphor layers 4a and 4c each have a pattern which is drawn larger on a near side to the phosphor layer 4b and drawn smaller on a far side from the phosphor layer 4b, in contrast to the image of the phosphor layer 4b. This is because each of the images of the phosphor layers 4a and 4c on the near side to the phosphor layer 4b has a tendency to be projected smaller on the screen 3 since the projection cathode-ray tube for red 1a and the projection cathode-ray tube 1c are arranged at a large tilt with respect to the screen 3. For this reason, correction of the image on the screen 3 is made by drawing the image larger on the nearer side to the phosphor layer 4b.

There arises such unbalance as the images of the phosphor layers 4a and 4c are each drawn larger on the near side to the phosphor layer 4b and drawn smaller on the far side from the phosphor layer 4b. The images with this unbalance are accompanied by the loss in resolution as discussed in (2) and the loss in luminance as discussed in (3) when it is projected on the screen, being magnified through the projection lens 2a or 2c, to produce difference in resolution and luminance between both sides of the image on the screen 3.

Thus, in the background art, there are problems of the loss in resolution and luminance which is produced more at the peripheral portion of the image on the screen 3 than at the center portion of the image on the screen 3, due to the phenomena (1), (2) and (3) and of the difference in resolution and luminance between both sides of the image on the screen 3 due to the phenomenon (4).

SUMMARY OF THE INVENTION

The present invention is directed to a projection television device. According to a first aspect of the present invention, the projection television device comprises: plurality of cathode-ray tube; a phosphor layer provided on at least one of the plural cathode-ray tube, having a thickness of the phosphor layer which varies continuously from a center portion of the phosphor layer toward a peripheral portion of the phosphor layer.

According to a second aspect, in the projection television device of the first aspect, the plurality of cathode-ray tube include a first projection cathode-ray tube, a second projection cathode-ray tube and a third projection cathode-ray tube which are individually used for different color.

According to a third aspect, in the projection television device of the first aspect, the thickness of the phosphor layer is thick at the center portion of the phosphor layer and is thinner at the peripheral portion of the phosphor layer.

According to a fourth aspect, in the projection television device of the third aspect, the thickness at the peripheral portion of the phosphor layer is a thickness to achieve the maximum luminance in view of the phosphor thickness-luminance characteristics.

According to a fifth aspect, in the projection television device of the fourth aspect, the thickness of the phosphor layer ranges approximately from 20 μm to 30 μm at the peripheral portion of the phosphor layer and ranges approximately from 40 μm to 50 μm at the center portion of the phosphor layer.

According to a sixth aspect, a projection television device comprises: three projection cathode-ray tubes consisting of a first projection cathode-ray tube, a second projection cathode-ray tube and a third projection cathode-ray tube which are disposed in this order; and a phosphor layer provided on at least one of the first projection cathode-ray tube and the third projection cathode-ray tube, having a thickness of the phosphor layer which varies continuously from a near side to the second projection cathode-ray tube toward a far side from the second projection cathode-ray tube.

According to a seventh aspect, in the projection television device of the six aspect, the thickness of the phosphor layer is thin on the near side to the second projection cathode-ray tube and is thicker on the far side from the second projection cathode-ray tube.

According to an eighth aspect, in the projection television device of the seventh aspect, the thickness on the near side of the phosphor layer to the second projection cathode-ray tube is a thickness to achieve the maximum luminance in view of the phosphor thickness-luminance characteristics.

According to a ninth aspect, in the projection television device of the eighth aspect, the thickness of the phosphor layer ranges approximately from 20 μm to 30 μm on the near side to the second projection cathode-ray tube and ranges approximately from 40 μm to 50 μm on the far side from the second projection cathode-ray tube.

According to a tenth aspect, a projection television device comprises: three projection cathode-ray tubes consisting of a first projection cathode-ray tube, a second projection cathode-ray tube and a third projection cathode-ray tube which are disposed in this order; a phosphor layer provided on the second projection cathode-ray tube, having a thickness of the phosphor layer which varies continuously from a center portion of the phosphor layer toward a peripheral portion of the phosphor layer; and a phosphor layer provided on at least one of the first projection cathode-ray tube and the third projection cathode-ray tube, having a thickness of the phosphor layer which varies continuously from a near side to the second projection cathode-ray tube toward a far side from the second projection cathode-ray tube.

According to an eleventh aspect, in the projection television device of the tenth aspect, the three projection cathode-ray tubes include a projection cathode-ray tube for red, green and blue, respectively.

In the projection television device of the first aspect, the spot diameter of the phosphor layer is not enlarged at a portion of the phosphor layer with a thinned thickness, in view of the thickness-spot diameter characteristics of the phosphor layer, to prevent aggravation of the ununiformity in the spot diameter. Therefore, the loss in resolution of the image projected on the screen gradually decreases as the thickness of the phosphor layer becomes thinner. Furthermore, in view of the thickness-luminance characteristics, the loss in luminance of the image on the screen gradually decreases as the thickness of phosphor layer becomes thinner.

With the phosphor layer having the thickness which varies continuously from its center portion toward its peripheral portion, the loss in resolution and luminance of the image projected on the screen corresponding to a portion of the phosphor layer with a thinned thickness can be suppressed, to thereby ensure uniform resolution and luminance. Thus, an effect of enhancing the quality of the image produced on the screen is achieved.

In the projection television device of the second aspect, the same function as discussed in the first aspect is performed with respect to each of the three projection cathode-ray tubes, and accordingly, the loss in resolution of the image on the screen and the loss in luminance decrease as the thickness of the phosphor layer becomes thinner.

Thus, also in the projection television device including three projection cathode-ray tubes (the projection television device for colored image), the loss in resolution and luminance of the image projected on the screen corresponding to a portion of the phosphor layer with a thinned thickness can be suppressed, to thereby ensure uniform resolution and luminance. Therefore, an effect of enhancing the quality of the image produced on the screen is achieved.

In the projection television device of the third aspect, both the loss in resolution and the loss in luminance at the peripheral portion of the image projected on the screen are suppressed.

In the projection television device of the fourth aspect, since the thickness of the phosphor layer at the peripheral portion is determined to achieve the maximum luminance, it is possible to provide excellent luminance.

In the projection television device of the fifth aspect, with the thickness of the phosphor layer which is determined to range approximately from 20 μm to 30 μm at the peripheral portion and determined to range approximately from 40 μm to 50 μm at the center portion, both the loss in resolution and the loss in luminance at the peripheral portion of the image projected on the screen are suppressed, to thereby achieve more excellent luminance.

In the projection television device of the sixth aspect, the spot diameter gradually becomes smaller as the thickness of the phosphor layer provided on at least one of the first and third projection cathode-ray tubes becomes thinner, in view of the thickness-spot diameter characteristics of the phosphor layer, and therefore the difference in resolution between both sides of the image projected on the screen decreases, even through a projection lens. Furthermore, in view of the thickness-luminance characteristics, the difference in luminance between both sides of the image projected on the screen decreases, even through the projection lens, as the thickness of the phosphor layer provided on at least one of the first and third projection cathode-ray tubes becomes thinner.

With the phosphor layer having the thickness which varies continuously from the near side to the second projection cathode-ray tube toward the far side, the difference in resolution and luminance between both sides of the image projected on the screen can be reduced, to thereby ensure uniform resolution and luminance. Therefore, an effect of enhancing the quality of the image produced on the screen is achieved.

In the projection television device of the seventh aspect, both the difference in resolution and the difference in luminance between both sides of the image projected on the screen decrease.

In the projection television device of the eighth aspect, since the thickness on the near side of the phosphor layer provided on at least one of the first and third projection cathode-ray tubes to the second projection cathode-ray tube is determined to achieve the maximum luminance, it is possible to provide excellent luminance.

In the projection television device of the ninth aspect, with the thickness of the phosphor layer provided on at least one of the first and third projection cathode-ray tubes which is determined to range approximately from 20 μm to 30 μm on the near side to the second projection cathode-ray tube and range approximately from 40 μm to 50 μm on the far side from the second projection cathode-ray tube, both the difference in resolution and the difference in luminance between both sides of the image projected on the screen decrease, to thereby achieve more excellent luminance.

In the projection television device of the tenth aspect, the loss in resolution of the image projected on the screen by the second projection cathode-ray tube is suppressed as the thickness of the phosphor layer on the second projection cathode-ray tube becomes thinner and the loss in luminance is also suppressed. The spot diameter gradually becomes smaller as the thickness of the phosphor layer provided on at least one of the first and third projection cathode-ray tubes becomes thinner and the difference in resolution between both sides of the image on the screen decreases, even through the projection lens. Moreover, the luminance gradually becomes higher as the thickness of the phosphor layer provided on at least one of the first and third projection cathode-ray tubes becomes thinner and the difference in luminance between both sides of the image on the screen decreases.

Thus, the loss in resolution and luminance of the image projected on the screen corresponding to a portion of the phosphor layer with a thinned thickness provided on the second projection cathode-ray tube is suppressed, to thereby ensure uniform resolution and luminance of the image, and the difference in resolution and luminance between both sides of the image projected on the screen by at least one of the first and third projection cathode-ray tubes is reduced, to thereby ensure uniform resolution and luminance of the image. Therefore, an effect of enhancing the quality of the image produced on the screen is achieved.

In the projection television device of the eleventh aspect, a red image projected from the projection cathode-ray tube for red, a green image projected from the projection cathode-ray tube for green and a blue image projected from the projection cathode-ray tube for blue are formed on the screen to produce a colored image.

Thus, a projection television device for colored image which is capable of producing a colored image with excellent quality on the screen is achieved.

An object of the present invention is to provide a projection television device which is capable of producing an image with excellent quality on the screen. To achieve this object, variations of a thickness of a phosphor layer are made to prevent the loss in resolution and luminance at the peripheral portion of the image projected on the screen and reduce the difference in resolution and luminance between both sides of the image projected on the screen.

These and other objects, features, aspects and advantages of the present invention will become more apparent from the following detailed description of the present invention when taken in conjunction with the accompanying drawings.

DESCRIPTION OF THE PREFERRED EMBODIMENTS

<The First Preferred Embodiment>

Figure 1:
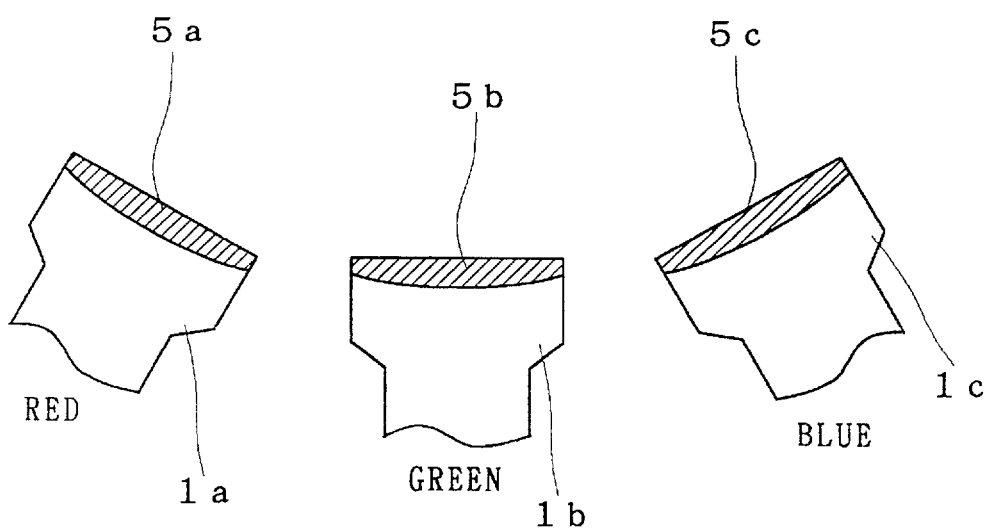
FIG. 1 is a cross-sectional view showing structures of phosphor layers used for a projection television device in accordance with a first preferred embodiment of the present invention.

Now, the first preferred embodiment will be discussed. FIG. 1 is a cross-sectional view showing structures of phosphor layers used for a projection television device in accordance with the first preferred embodiment of the present invention. Phosphor layers 5a, 5b and 5c shown in FIG. 1 each have a thickness which varies continuously so that it may be thick at its center portion and may be thinner at its peripheral portion. Other reference characters of FIG. 1 correspond to those of FIG. 7.

Figure 6:
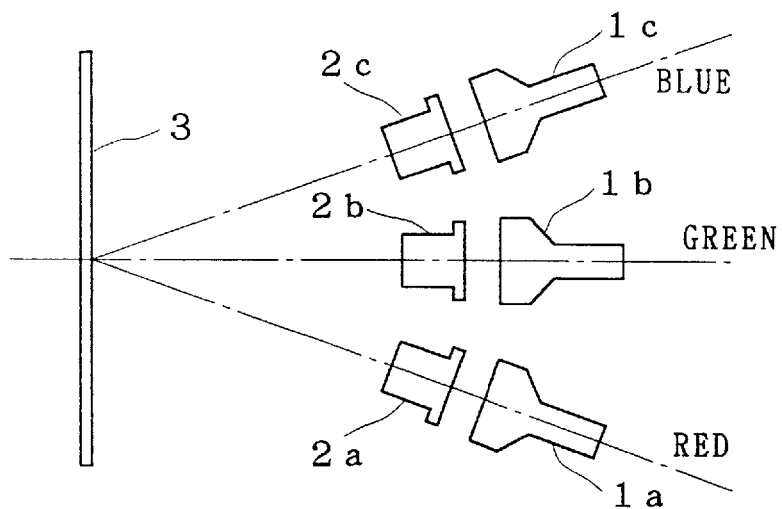
FIG. 6 is a schematic diagram showing a construction of a projection television device including three phosphor layers.
Figure 7:
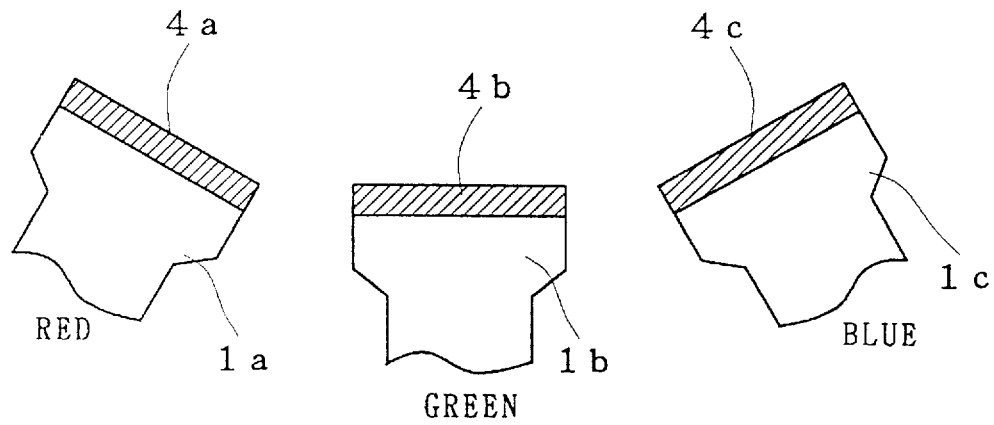
FIG. 7 is a cross-sectional view showing structures of phosphor layers used for a projection television device in a background art.
Figure 8:
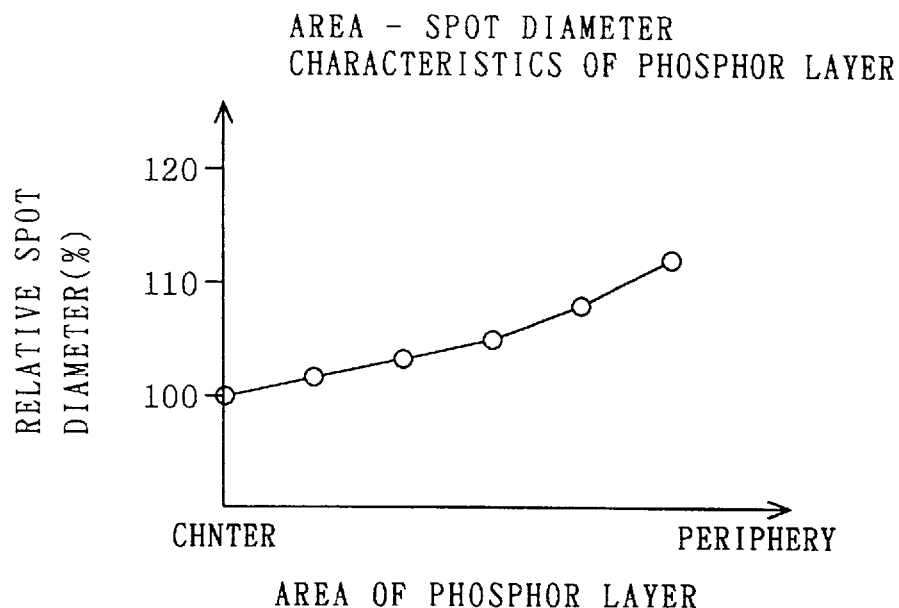
FIG. 8 is a graphical representation of characteristics, showing a relation between an area and a spot diameter of a phosphor layer.
Figure 9:
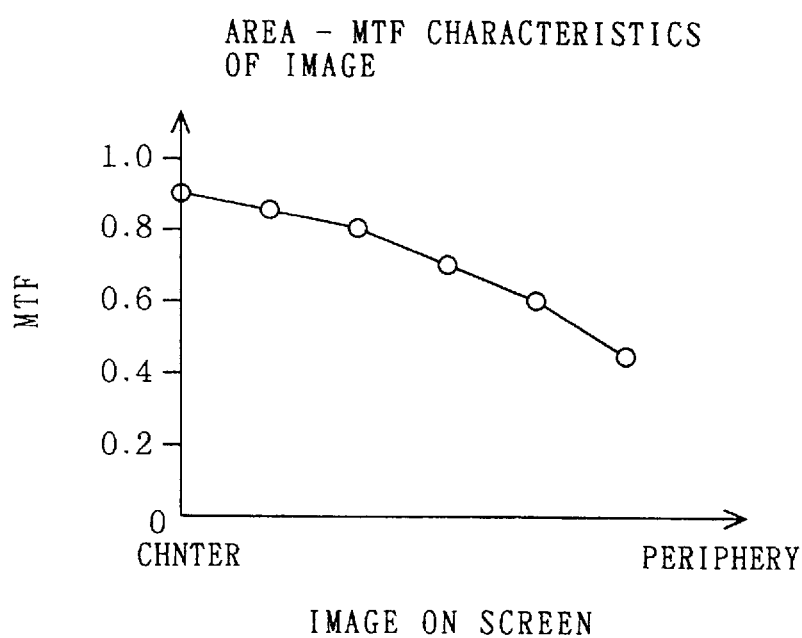
FIG. 9 is a graphical representation of characteristics, showing a relation between an area and a resolution (MTF) of an image projected on a screen.
Figure 10:
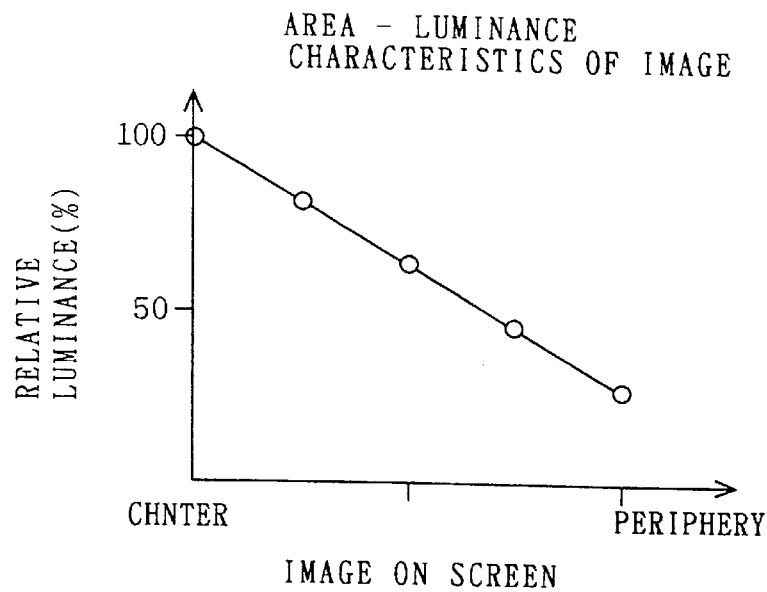
FIG. 10 is a graphical representation of characteristics, showing a relation between an area and a luminance of an image projected on a screen.
Figure 11:
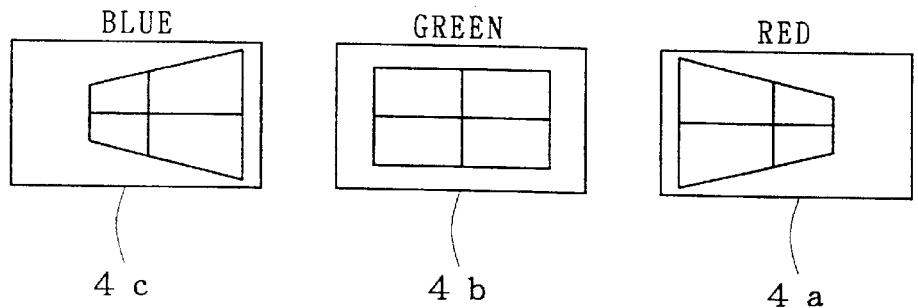
FIG. 11 is a diagram showing an example of images drawn on the phosphor layers.
Figure 12:
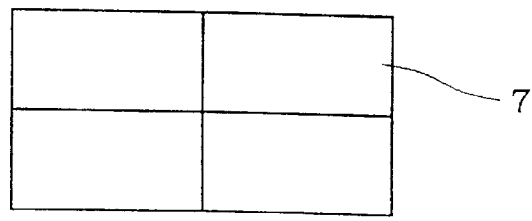
FIG. 12 is a representation of an example of image produced on a screen.

The projection television device of this preferred embodiment includes the phosphor layers 5a, 5b and 5c of FIG. 1, instead of the phosphor layers 4a, 4b and 4c of FIG. 7, which are arranged in the same manner as the projection television device shown in FIG. 6.

This preferred embodiment is intended to compensate the loss in resolution and luminance due to the phenomena (1), (2) and (3) as discussed in the background art by making variations of the thickness of the phosphor layer.

Figure 2:
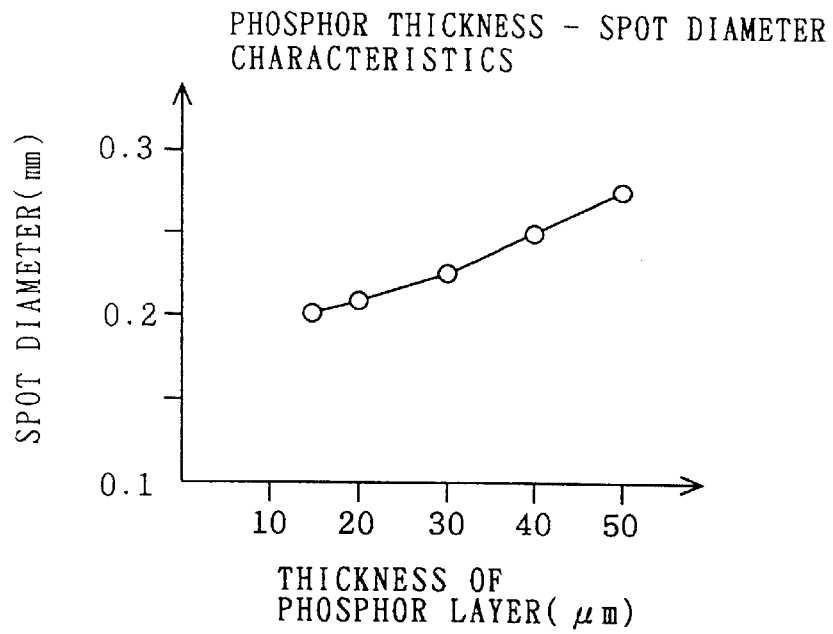
FIG. 2 is a graphical representation of characteristics, showing a relation between a phosphor thickness and a spot diameter of a phosphor layer.

FIG. 2 is a graphical representation of characteristics, showing a relation between a thickness and a spot diameter of a phosphor layer. As can be seen from FIG. 2, the spot diameter becomes smaller as the thickness of the phosphor layer becomes thinner. Accordingly, in order to make the spot diameter smaller, the thickness of the phosphor layer has to be thinned. Since the spot diameter of each of the phosphor layers 4a, 4b and 4c of FIG. 7 becomes larger as the distance from the center portion increases, the thickness of each of the phosphor layers 5a, 5b and 5c of FIG. 1 should be continuously changed to be thinner toward the periphery.

The above configuration of the phosphor layers 5a, 5b and 5c makes the spot diameter at the peripheral portion smaller to ensure a uniform spot diameter anywhere, and accordingly the loss in resolution at the peripheral portion of the image projected on the screen 3 is suppressed. Furthermore, continuous variation of the thickness causes no abrupt change in resolution.

Figure 3:
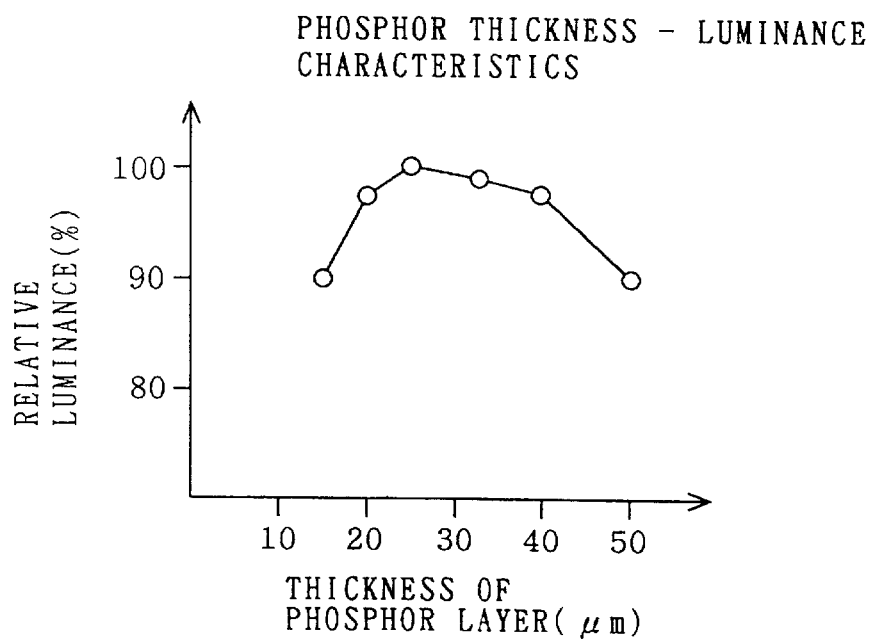
FIG. 3 is a graphical representation of characteristics, showing a relation between a phosphor thickness and a luminance of a phosphor layer.

FIG. 3 is a graphical representation of characteristics, showing a relation between a thickness and a luminance of a phosphor layer. As can be seen from FIG. 3, the maximum luminance is achieved when the thickness ranges approximately from 20 $\mu$m to 30 $\mu$m, and the luminance becomes lower as the thickness becomes thicker or thinner than the thickness to achieve the maximum luminance. Accordingly, in order to enhance the luminance, the thickness has to be determined close to the thickness to achieve the maximum luminance. Since the luminance of each of the phosphor layers 4a, 4b and 4c of FIG. 7 becomes lower as the distance from the center portion increases, the thickness should be determined close to the thickness to achieve the maximum luminance at the nearer portion to the periphery.

The above configuration makes it possible to suppress the loss in resolution at the peripheral portion of the image projected on the screen 3. Furthermore, continuous variation of the thickness causes no abrupt change in luminance.

If the luminance is solely taken into consideration, two types of phosphor layers may be possible to achieve the maximum luminance: one is a concave phosphor layer of which the thickness is determined close to the thickness to achieve the maximum luminance at the peripheral portion and determined thinner than the thickness to achieve the maximum luminance at the center portion, and the other is a convex phosphor layer of which the thickness is determined close to the thickness to achieve the maximum luminance at the peripheral portion and determined thicker than the thickness to achieve the maximum luminance at the center portion.

Additionally taking the resolution into consideration, the convex phosphor layer as shown in FIG. 1 can effectively suppress the loss both in resolution and luminance. For example, a phosphor layer having a thickness which varies continuously so that it may range approximately from 40 $\mu$m to 50 $\mu$m at the center portion and may range approximately from 20 $\mu$m to 30 $\mu$m at the peripheral portion can suppress the loss both in resolution and luminance. Furthermore, since the phosphor layer has the thickness to achieve the maximum luminance at the peripheral portion, it is possible to provide excellent luminance and resolution.

The thickness of the phosphor layer has to be determined so as not to aggravate the loss in resolution and luminance of the image obtained by the background-art projection television device. For example, the thickness of the phosphor layer which is much thicker than that of the background art both at the center and peripheral portions causes much loss both in resolution and luminance, even if it varies continuously so as to be thick at the center portion and to be thinner at the peripheral portion. That should be avoided.

Thus, the phosphor layers 5a, 5b and 5c each having a thickness which varies continuously from the center portion toward the peripheral portion makes it possible to suppress the loss in resolution and luminance at the peripheral portion of the image projected on the screen 3 to ensure uniform resolution and luminance of the image, thereby enhancing the quality of the image produced on the screen 3.

Furthermore, if at least one of the phosphor layers 4a, 4b and 4c of FIG. 7 has a thickness which varies continuously from the center portion toward the peripheral portion of the phosphor layer, the above compensation is accordingly made with respect to at least one of the red image, green image and blue image. It is surely preferable, however, to have the configuration as shown in FIG. 1 in order to compensate all of the colored images.

<The Second Preferred Embodiment>

Figure 4:
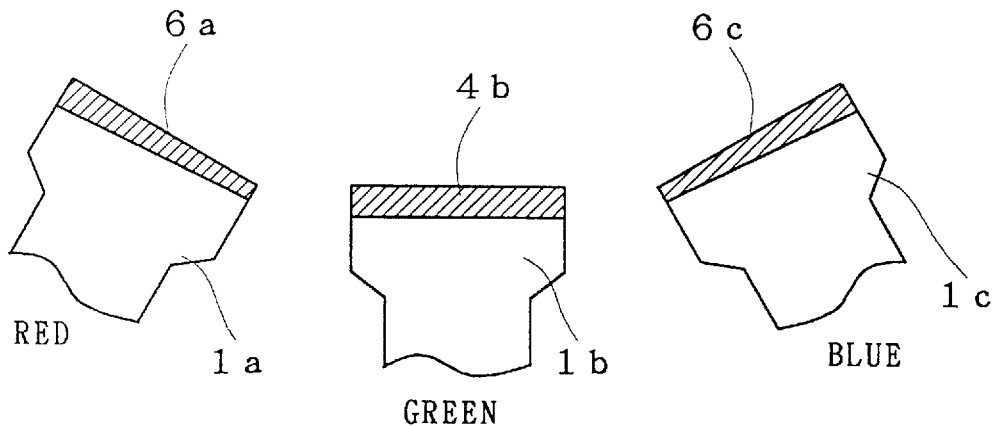
FIG. 4 is a cross-sectional view showing structures of phosphor layers used for a projection television device in accordance with a second preferred embodiment of the present invention.

Next, the second preferred embodiment will be discussed. FIG. 4 is a cross-sectional view showing structures of phosphor layers used for a projection television device in accordance with the second preferred embodiment of the present invention. Phosphor layers 6a, 6b and 6c shown in FIG. 4 each have a thickness which varies continuously from the near side to the projection cathode-ray tube for green toward the far side. Other reference characters of FIG. 4 correspond to those of FIG. 7.

The projection television device of this preferred embodiment includes the phosphor layers 6a, 6b and 6c of FIG. 4, instead of the phosphor layers 4a, 4b and 4c of FIG. 7, which are arranged in the same manner as the projection television device shown in FIG. 6.

This preferred embodiment is intended to compensate the difference in resolution and luminance between both sides of the image projected on the screen 3 due to the phenomenon (4) as discussed in the background art by making variations of the thickness of the phosphor layer.

As can be seen from FIG. 2, the spot diameter becomes smaller, that is, the resolution of the image projected on the screen 3 becomes better as the thickness of the phosphor layer becomes thinner. Accordingly, the thickness of the phosphor layer has to be thinned in order to prevent the loss in resolution. Since the image projected on the screen 3 corresponding to each of the phosphor layers 4a and 4c of FIG. 7 on the nearer side to the projection cathode-ray tube for green 1b have lower luminance, the thickness of each of the phosphor layers 6a and 6c is continuously changed to be thinner from the far side toward the near side to the projection cathode-ray tube for green 1b.

The above configuration diminishes the spot diameter of the image of each of the phosphor layers 6a and 6c on the near side to the projection cathode-ray tube for green 1b, to thereby reduce the difference in resolution between both sides of the image projected on the screen 3. Furthermore, continuous variation of the thickness causes no abrupt change in resolution.

As can be seen from FIG. 3, the maximum luminance is achieved when the thickness ranges approximately from 20 $\mu$m to 30 $\mu$m, and the luminance becomes lower as the thickness becomes thicker or thinner than the thickness to achieve the maximum luminance. Accordingly, in order to enhance the luminance, the thickness has to be determined close to the thickness to achieve the maximum luminance. Since the image projected on the screen 3 corresponding to the phosphor layers 4a and 4c of FIG. 7 on the nearer side to the projection cathode-ray tube for green 1b has lower luminance, the thickness of each of the phosphor layers 4a and 4c of FIG. 7 should be determined close to the thickness to achieve the maximum luminance on the nearer side to the projection cathode-ray tube for green 1b.

The above configuration makes it possible to reduce the difference in resolution and luminance between both sides of the image projected on the screen 3. Furthermore, continuous variation of the thickness causes no abrupt change in luminance.

If the luminance is solely taken into consideration, two types of phosphor layers may be possible to achieve the maximum luminance: one has a configuration where the thickness is determined close to the thickness to achieve the maximum luminance on the near side to the projection cathode-ray tube for green 1b and determined thinner than the thickness to achieve the maximum luminance on the far side, and the other has a configuration where the thickness is determined close to the thickness to achieve the maximum luminance on the near side to the projection cathode-ray tube 1b and determined thicker than the thickness to achieve the maximum luminance on the far side.

Additionally taking the resolution into consideration, the phosphor layers 6a and 6c as shown in FIG. 4, each of which has a thickness close to the thickness to achieve the maximum luminance on the near side to the projection cathode-ray tube for green 1b and thicker on the far side, can effectively suppress the loss both in resolution and luminance. For example, a phosphor layer having a thickness which varies continuously so that it may range approximately from 40 $\mu$m to 50 $\mu$m on the far side from the projection cathode-ray tube for green 1b and may range approximately from 20 $\mu$m to 30 $\mu$m on the near side to the projection cathode-ray tube for green 1b can reduce the difference both in resolution and luminance between both sides of the image on the screen 3. Furthermore, since the phosphor layer has the thickness to achieve the maximum luminance on the near side to the projection cathode-ray tube for green 1b, that is, on the end portion where an image is drawn larger, it is possible to provide excellent luminance and resolution.

The thickness of the phosphor layer has to be determined so as not to aggravate the loss in resolution and luminance of the image obtained by the background-art projection television device. For example, the thickness of the phosphor layer which is much thicker than that of the background art both on the near side to the projection cathode-ray tube for green 1b and on the far side causes much loss both in resolution and luminance, even if it varies continuously so as to be thicker on the near side and to be thinner on the fax side. That should be avoided.

Thus, the phosphor layers each having a thickness which varies continuously from the near side to the centered projection cathode-ray tube toward the far side makes it possible to reduce the difference in resolution and luminance between both sides of the image projected on the screen 3 to ensure uniform resolution and luminance of the image, thereby enhancing the quality of the image produced on the screen 3.

Furthermore, if either of the phosphor layers 4a and 4c of FIG. 7 has a thickness which varies continuously from one side to the other side of the phosphor layer, the above compensation is accordingly made with respect to either the red image or blue image. It is surely preferable, however, to have the configuration make a compensation as shown in FIG. 4 in order to compensate both of the red image and blue image.

<The Third Preferred Embodiment>

Figure 5:
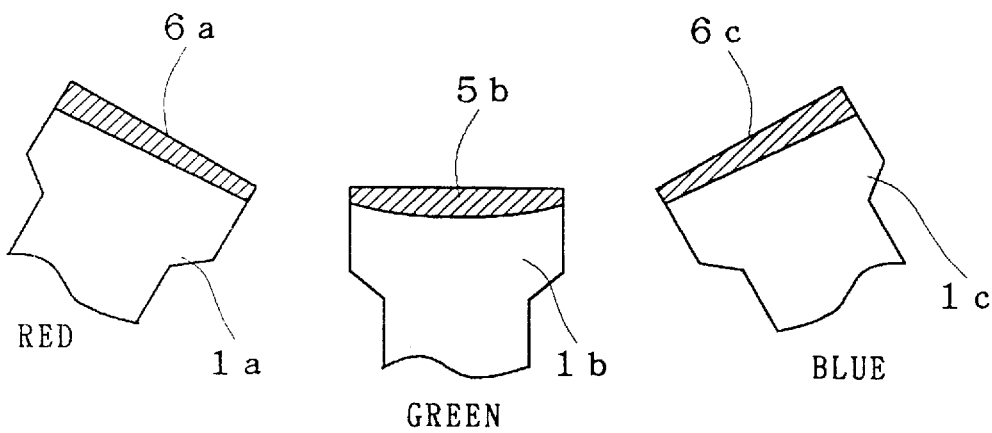
FIG. 5 is a cross-sectional view showing structures of phosphor layers used for a projection television device in accordance with a third preferred embodiment of the present invention.

Next, the third preferred embodiment will be discussed. FIG. 5 is a cross-sectional view showing structures of phosphor layers used for a projection television device in accordance with the third preferred embodiment of the present invention.

As shown in FIG. 5, a phosphor layer 5b is provided on the projection cathode-ray tube for green 1b, instead of the phosphor layer 4b of FIG. 4. The same process as discussed in the first preferred embodiment is done to project a green image on the screen 3 and the same process as discussed in the second preferred embodiment is done to project red and blue images on the screen 3.

Furthermore, the phosphor layer provided on the projection cathode-ray tube for red 1a and the phosphor layer provided on the projection cathode-ray tube for blue 1c may each have a thickness which is determined close to the thickness to achieve the maximum luminance on the near side to the projection cathode-ray tube for green 1b and determined thinner on the far side, but as discussed in the second preferred embodiment, it is preferable for both the phosphor layers provided on the projection cathode-ray tubes 1a and 1c to each have the configuration where its thickness is determined close to the thickness to achieve the maximum luminance on the near side to the projection cathode-ray tube for green 1b and determined thicker on the far side.

Moreover, either of the phosphor layers on the projection cathode-ray tube for red 1a and projection cathode-ray tube for blue 1c may have a thickness which varies continuously from the near side to the projection cathode-ray tube for green 1b toward the far side, but it is preferable that both of the phosphor layers on the projection cathode-ray tubes 1a and 1c should each have a thickness which varies continuously from the near side to the projection cathode-ray tube for green 1b toward the far side.

The above configuration of phosphor layers makes it possible to suppress the loss in resolution and luminance at the peripheral portion of the green image projected on the screen 3 and to reduce the difference in resolution and luminance between both sides of each of the red image and the blue image, thus ensuring uniform resolution and luminance of the image. As the result, the image with excellent quality can be produced on the screen 3.

Furthermore, although the projection cathode-ray tube for red 1a, the projection cathode-ray tube for green 1b and the projection cathode-ray tube for blue 1c are arranged in this order in FIGS. 1, 4 and 5, the projection cathode-ray tubes may be arranged in other order.

While the invention has been shown and described in detail, the foregoing description is in all aspects illustrative and not restrictive. It is therefore understood that numerous modifications and variations can be devised without departing from the scope of the invention.

I claim:

1. A projection television device, comprising:
   a plurality of cathode-ray tubes; and
   a phosphor layer provided on at least one of said plural cathode-ray tubes, having a thickness of said phosphor layer which varies continuously from a center portion of said phosphor layer toward a peripheral portion of said phosphor layer, wherein said thickness of said phosphor layer is thick at said center portion of said phosphor layer and is thinner at said peripheral portion of said phosphor layer.

2. The projection television device of claim 1, wherein said plurality of cathode-ray tubes include a first projection cathode-ray tube, a second projection cathode-ray tube and a third projection cathode-ray tube which are individually used for different colors.

3. The projection television device of claim 1, wherein said thickness at said peripheral portion of said phosphor layer is a thickness to achieve the maximum luminance in view of the phosphor thickness-luminance characteristics.

4. The projection television device of claim 3, wherein said thickness of said phosphor layer ranges approximately from 20 $\mu$m to 30 $\mu$m at said peripheral portion of said phosphor layer and ranges approximately from 40 $\mu$m to 50 $\mu$m at said center portion of said phosphor layer.

5. A projection television device, comprising:
   three projection cathode-ray tubes including a first projection cathode-ray tube, a second projection cathode-ray tube and a third projection cathode-ray tube; and
   a phosphor layer provided on at least one of said first projection cathode-ray tube and said third projection cathode-ray tube, having a thickness of said phosphor layer which varies continuously from a near side to said second projection cathode-ray tube toward a far side from said second projection cathode-ray tube.

6. The projection television device of claim 5, wherein said thickness of said phosphor layer is thin on said near side to said second projection cathode-ray tube and is thicker on said far side from said second projection cathode-ray tube.

7. The projection television device of claim 6, wherein said thickness on said near side of said phosphor layer to said second projection cathode-ray tube is a thickness to achieve the maximum luminance in view of the phosphor thickness-luminance characteristics.

8. The projection television device of claim 7, wherein said thickness of the said phosphor layer ranges approximately from 20 $\mu$m to 30 $\mu$m on said near side to said second projection cathode-ray tube and ranges approximately from 40 $\mu$m to 50 $\mu$m on said far side from said second projection cathode-ray tube.

9. A projection television device comprising:
   three projection cathode-ray tubes including a first projection cathode-ray tube, a second projection cathode-ray tube and a third projection cathode-ray tube;
   a phosphor layer provided on said second projection cathode-ray tube, having a thickness of said phosphor layer which varies continuously from a center portion of said phosphor layer toward a peripheral portion of said phosphor layer; and
   a phosphor layer provided on at least one of said first projection cathode-ray tube and said third projection cathode-ray tube, having a thickness of said phosphor layer which varies continuously from a near side to said second projection cathode-ray tube toward a far side from said second projection cathode-ray tube.

10. The projection television device of claim 9, wherein said three projection cathode-ray tubes include a projection cathode-ray tube for red, green and blue, respectively.

11. A projection television device, comprising:
    at least one cathode-ray tube; and
    a phosphor layer provided on said cathode-ray tube,
    wherein a center portion of said phosphor layer has a thickness greater than a thickness of a peripheral portion of said phosphor layer.

12. The projection television device of claim 11, wherein said phosphor layer varies continuously from said center portion of said phosphor layer toward said peripheral portion of said phosphor layer.

13. The projection television device of claim 11, wherein said phosphor layer is irradiated by an electron beam, the electron beam entering the center portion at a first angle of incidence producing a first spot diameter at a first point of entry, and the electron beam entering the peripheral portion at a second angle of incidence larger than said first angle of incidence producing a second spot diameter at a second point of entry, said phosphor layer compensating for a difference between the second angle of incidence and the first angle of incidence to prevent the second spot diameter from substantially differing from the first spot diameter.

14. A projection television device for projecting an image, comprising:
    at least one cathode-ray tube; and
    compensating means, provided on said at least one cathode-ray tube, said compensating means having a center portion and a peripheral portion, said compensating means being irradiated by an electron beam,
    wherein the electron beam enters the center portion at a first angle of incidence producing a first spot diameter at a first point of entry, and the electron beam enters the peripheral portion at a second angle of incidence larger than said first angle of incidence producing a second spot diameter at a second point of entry,
    said compensating means for compensating for a difference between the second angle of incidence and the first angle of incidence to prevent the second spot diameter from substantially differing from the first spot diameter.

15. The projection television device of claim 14, wherein said compensating means includes a phosphor layer, the center portion of said phosphor layer having a thickness greater than a thickness of the peripheral portion of said phosphor layer.

16. A method for improving at least one of the resolution and luminance of a projection television device, comprising the steps of:

providing at least one cathode-ray tube; and coating the at least one cathode-ray tube with a phosphor layer, wherein a center portion of said phosphor layer has a thickness greater than a thickness of a peripheral portion of said phosphor layer.

17. The method of claim 16, wherein the phosphor layer is irradiated by an electron beam, the electron beam entering the center portion at a first angle of incidence producing a first spot diameter at a first point of entry, and the electron beam entering the peripheral portion at a second angle of incidence larger than the first angle of incidence producing a second spot diameter at a second point of entry, and the phosphor layer compensating for a difference between the second angle of incidence and the first angle of incidence to prevent the second spot diameter from substantially differing from the first spot diameter.

* * * * *